United States Patent
Johnson

(12) 
(10) Patent No.: US 6,574,912 B1
(45) Date of Patent: Jun. 10, 2003

(54) PIPE OR BEAM MOUNTED RODENT TRAP

(75) Inventor: Daniel C. Johnson, Madison, WI (US)

(73) Assignee: Bell Laboratories, Inc., Madison, WI (US)

( * ) Notice: Subject to any disclaimer, the term of this patent is extended or adjusted under 35 U.S.C. 154(b) by 0 days.

(21) Appl. No.: 10/194,721

(22) Filed: Jul. 12, 2002

(51) Int. Cl.[7] ............................................. A01M 23/26
(52) U.S. Cl. ....................... 43/88; 43/58; 43/89; 43/96
(58) Field of Search ................................ 43/81, 81.5, 82, 43/83, 83.5, 88–97

(56) References Cited

U.S. PATENT DOCUMENTS

| | | | | |
|---|---|---|---|---|
| 575,204 A | * | 1/1897 | Booth | 43/89 |
| 977,240 A | * | 11/1910 | Ward | 43/58 |
| 1,052,547 A | * | 2/1913 | Worthington | 43/58 |
| 1,060,993 A | * | 5/1913 | Maynard | 43/58 |
| 1,080,623 A | * | 12/1913 | Brorby | 43/88 |
| 1,123,410 A | * | 1/1915 | Smith | 43/88 |
| 1,160,634 A | * | 11/1915 | Maynard | 43/58 |
| 1,164,483 A | * | 12/1915 | Duplantis | 43/58 |
| 1,176,778 A | * | 3/1916 | Rittelmann | 43/97 |
| 1,199,901 A | * | 10/1916 | Keefner | 43/81 |
| 1,282,423 A | * | 10/1918 | Honan | 43/58 |
| 1,409,924 A | * | 3/1922 | Byrne | 43/96 |
| 1,422,049 A | * | 7/1922 | Gould | 43/82 |
| 1,624,548 A | * | 4/1927 | Glasshoffer | 43/81 |
| 1,858,713 A | * | 5/1932 | Martin | 43/96 |
| 1,868,554 A | * | 7/1932 | Wilbern | 43/58 |
| 1,982,393 A | * | 11/1934 | Miller | 43/96 |
| 1,992,353 A | * | 2/1935 | Cattanach | 43/81 |
| 2,068,492 A | * | 1/1937 | Johnson | 43/83 |
| 2,138,092 A | * | 11/1938 | Evans | 43/83.5 |
| 2,174,929 A | * | 10/1939 | Slutz | 43/83 |
| 2,258,549 A | * | 10/1941 | Drake | 43/83 |
| 2,332,334 A | * | 10/1943 | Morrison | 43/81 |
| 2,388,539 A | * | 11/1945 | Hartman | 43/96 |
| 2,513,130 A | * | 6/1950 | Arnest | 43/96 |
| 2,513,141 A | * | 6/1950 | Carder et al. | 43/58 |
| 2,574,322 A | * | 11/1951 | Fitzsimons | 43/81 |
| 2,612,720 A | * | 10/1952 | Shilts | 43/96 |
| 2,724,209 A | * | 11/1955 | Cain | 43/83.5 |
| 3,747,259 A | * | 7/1973 | Pellowski | 43/96 |
| 4,020,585 A | * | 5/1977 | Benschoter | 43/96 |

(List continued on next page.)

OTHER PUBLICATIONS

U.S. patent application No. 10/002,401, filed Oct. 26, 2001.
Photographs of a Mechanical Rodent Trap Support Tray, date unknown.

*Primary Examiner*—Darren W. Ark
(74) *Attorney, Agent, or Firm*—Lathrop & Clark LLP

(57) ABSTRACT

A plastic upper jaw is pivotably mounted by a steel pin to a plastic base. A spring urges the jaw to close upon the base. A trigger is pivotably mounted to the base. A catch restrains the upper jaw in a set position until the trigger is actuated. The base has two upwardly extending side walls. Each side wall has a cable opening adjacent the floor of the base. A cable tie is looped around a pipe or support member and extends through the opposed openings in the opposite side walls. The ends of the tie are connected to secure the rodent trap to the support member. Because the upper jaw provides a wide gripping area, allowing the trap to be safely set, the trap is readily moved into the set position while it is secured to the support member, even if in an overhead position.

3 Claims, 3 Drawing Sheets

U.S. PATENT DOCUMENTS

| | | | | |
|---|---|---|---|---|
| 4,152,861 A | * | 5/1979 | Miller | 43/96 |
| 4,270,300 A | * | 6/1981 | Schultz | 43/82 |
| 4,366,642 A | * | 1/1983 | Gardner et al. | 43/88 |
| 4,369,595 A | | 1/1983 | Kness et al. | |
| 4,458,394 A | * | 7/1984 | Schultz | 43/96 |
| 4,477,997 A | * | 10/1984 | Bumgarner | 43/58 |
| 4,517,762 A | * | 5/1985 | Venetz | 43/96 |
| 4,549,367 A | * | 10/1985 | Jones, Sr. | 43/88 |
| 4,578,893 A | | 4/1986 | Wickenberg | |
| 4,658,536 A | | 4/1987 | Baker | |
| 4,665,644 A | * | 5/1987 | Vajs et al. | 43/82 |
| 4,703,583 A | * | 11/1987 | Dzurkovich et al. | 43/82 |
| 4,711,049 A | | 12/1987 | Kness | |
| 4,780,984 A | * | 11/1988 | Courty | 43/89 |
| 4,803,799 A | * | 2/1989 | Vajs et al. | 43/82 |
| 4,825,579 A | * | 5/1989 | Dzurkovich et al. | 43/82 |
| 5,224,287 A | * | 7/1993 | Knudsen | 43/81 |
| 5,337,512 A | * | 8/1994 | Krenzler | 43/82 |
| 5,930,944 A | * | 8/1999 | Knuppel | 43/58 |
| 5,987,811 A | * | 11/1999 | Wiesener et al. | 43/96 |
| 6,164,010 A | * | 12/2000 | Snell et al. | 43/81 |
| 6,266,917 B1 | * | 7/2001 | Hight | 43/58 |
| 6,397,517 B1 | | 6/2002 | Leyerle et al. | |
| 6,415,544 B1 | * | 7/2002 | Leyerle et al. | 43/90 |
| 6,508,031 B1 | * | 1/2003 | Johnson et al. | 43/88 |

* cited by examiner

PIPE OR BEAM MOUNTED RODENT TRAP

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to rodent traps in general, and to rodent traps which can be fixed in place in particular.

Rodents such as mice and rats are perennial pests, devouring food stores, spreading disease, soiling dwellings and storage and production facilities, and degrading fixtures and structures by gnawing, scratching, and nesting. Some rodent infestations may be dealt with by the distribution of poisoned bait. In other situations, where it is desirable to avoid the use of rodenticide, or where the retention of the targeted rodent is necessary, mechanical rodent traps may be employed.

For the capture of rates, sturdy mechanical rodent traps have been developed, such as the "Rodent Trap with Removable Bait Container" disclosed in U.S. patent application Ser. No. 10/002,401, filed Oct. 26, 2001, and incorporated by reference herein.

Not only do rodents travel along the ground, but many varieties have the ability to climb up to elevated structures such as beams, rafters, pipes, and conduits. In these elevated positions, a rodent can often travel throughout a facility, spreading contamination and evading ready capture.

One approach to trapping rodents traveling along pipes or beams has been to place a thermoformed plastic tray, large enough for two rodent traps, on the pipe. The tray is held in place by cable ties which pass through pairs of vertically extending cable holes formed in the horizontal base wall of the tray. Conventional rodent traps having an exposed metal bail are then set, and, after being set, are placed on the horizontal platform provided by the tray. The rodent traps are not secured to the tray, and after use, they are removed from the tray to be set and are then replaced on the tray.

What is needed is a rodent trap which can be conveniently placed upon beams or pipes and readily set by an operator.

SUMMARY OF THE INVENTION

The rodent trap of this invention has a plastic base to which a plastic upper jaw is pivotably mounted by a steel pin. A spring is engaged between the base and the upper jaw and urges the jaw to close upon the base. A trigger is pivotably mounted by the pin to ears which project upwardly from the base. A catch mechanism operates to restrain the upper jaw in a set position until the trigger is actuated. The base has two upwardly extending side walls. Each side wall has an opening adjacent the floor of the base. A cable tie extends through the opposed openings in the opposite side walls and is looped around a pipe, beam, or other support member. The ends of the tie are connected to secure the rodent trap to the support member upon which it is mounted. The rodent trap is thus secured directly to the support member without any intervening support platform. Because the plastic upper jaw provides a wide gripping area, and because the trap may be safely set by pressing on the upper jaw, the trap is readily moved into the set position while it is secured to the support member, even if in an overhead position. Once a rodent has been caught in the trap, the trap may be opened, the rodent extracted, and the trap set again, without removing the trap from its tied position on the support member.

It is an object of the present invention to provide a mechanical rodent trap which is readily mounted to a beam or pipe.

It is another object of the present invention to provide a rodent trap which may be attached overhead and conveniently set when in the overhead position.

Further objects, features and advantages of the invention will be apparent from the following detailed description when taken in conjunction with the accompanying drawings.

DESCRIPTION OF THE PREFERRED EMBODIMENTS

Figure 1:
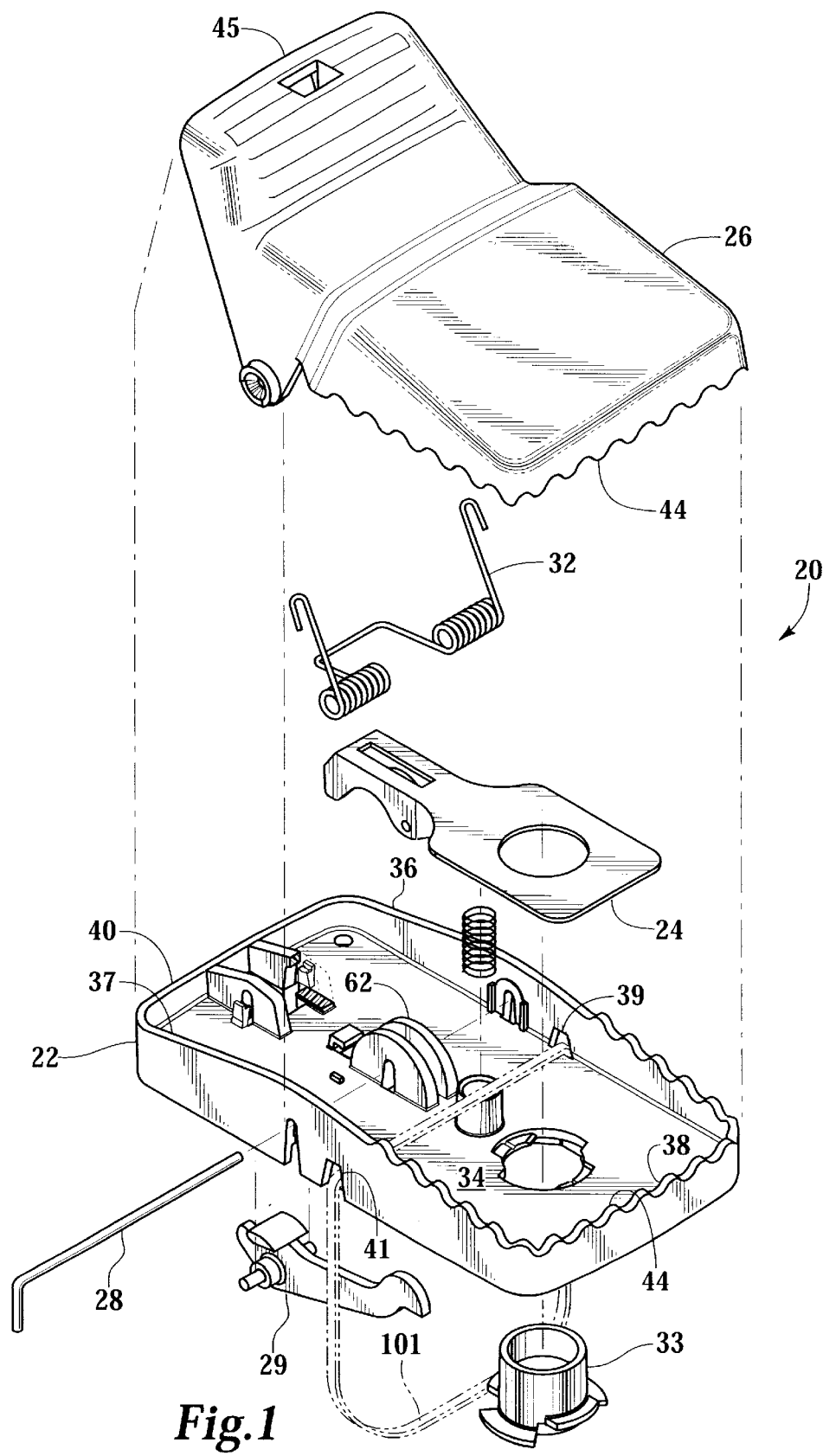
FIG. 1 is an exploded isometric view of the rodent trap of this invention.

Referring more particularly to FIGS. 1–4, wherein like numbers refer to similar parts, a rodent trap 20 of this invention is shown in FIG. 1. The trap has a plastic base 22 to which a plastic trigger 24 and upper jaw 26 are pivotably connected by a metal pin 28. A catch mechanism 30 extends from the base 22 and engages with the trigger and the upper jaw 26 to retain the upper jaw 26 in a set position against the force of a spring 32 which tends to urge the upper jaw 26 into a sprung or trapping position. The base and upper jaw may be provided with interdigitating teeth 44 which project in a manner similar to the teeth disclosed in U.S. Patent No. U.S. Pat. No. 6,415,544, the disclosure of which is incorporated by reference herein. A bait container 33 is removably connected to the base 22. The plastic parts may be injection molded of, for example, ABS plastic or polystyrene.

The trap 20 is preferably large enough to accommodate rats. The base 22 may be about 5.6 inches long and three inches wide. The base 22 has a horizontal platform wall 34 with a vertically extending first side wall 36 and second side wall 37. A front wall 38 and a rear wall 40 extend between the side walls 36, 37. The platform wall 34 is supported about 0.20 inches above the support surface on which the trap rests, and preferably has a pattern of reinforcing ribs on its underside, not shown. The first side wall 36 has a first opening 39 which extends above the level of the platform wall 34, and the second side wall 37 has a second opening 41 which also extends above the level of the platform wall.

Figure 2:
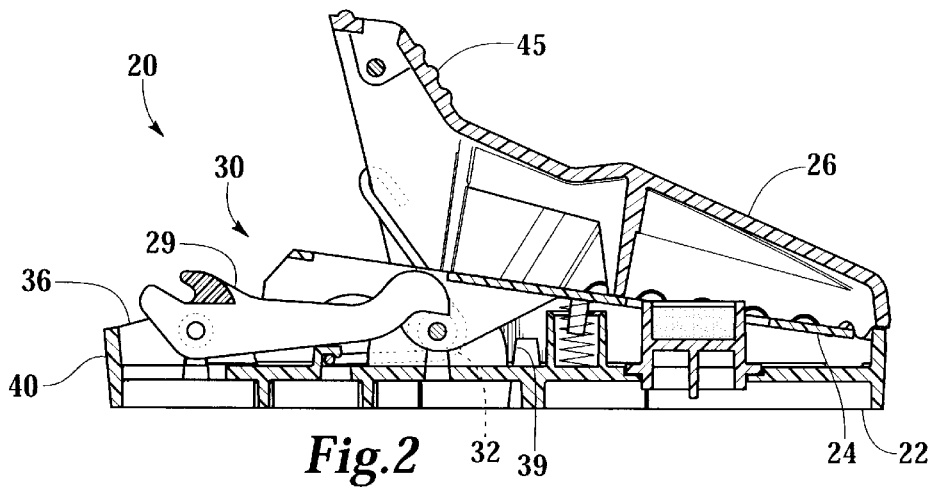
FIG. 2 is a cross-sectional view of the trap of FIG. 1 shown in a sprung position.
Figure 3:
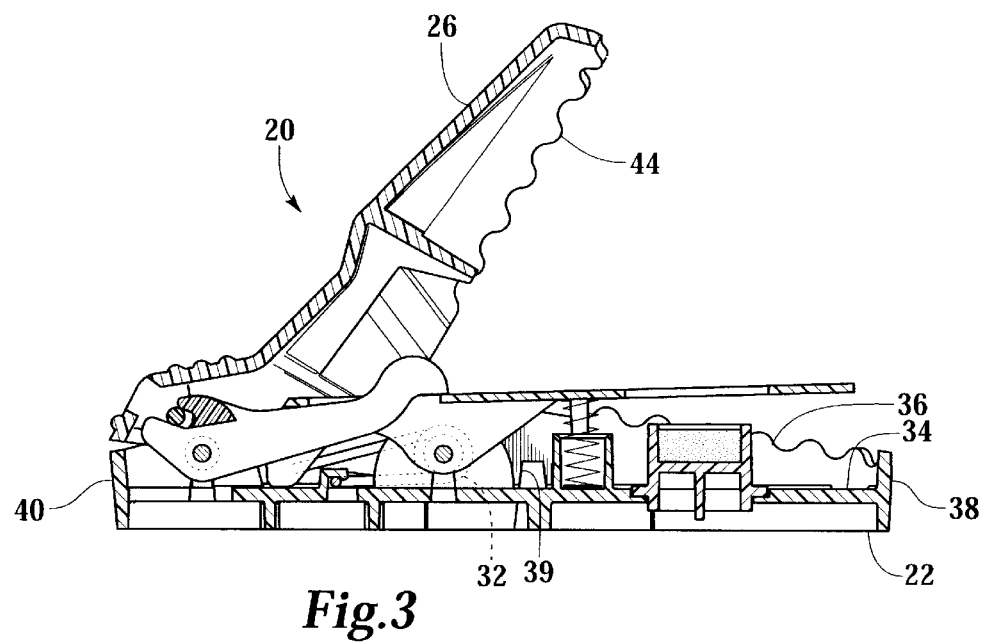
FIG. 3 is an exploded cross-sectional view of the trap of FIG. 2 shown in a set position.

Two ears 62 extend upwardly from the base 22 above the platform wall 34. The trigger and the upper jaw 26 are pivotably mounted to the base by the pin 28 which extends through the ears 62. The spring 32 is mounted about the pin 28 and acts to urge the upper jaw into a sprung position. When the trap 20 is in a set position, as shown in FIG. 3, the upper jaw 26 is retained by a catch element 29 of the catch mechanism 30. When the trigger is depressed by a rodent, the upper jaw 26 closes on the base as shown in FIG. 2.

Figure 4:
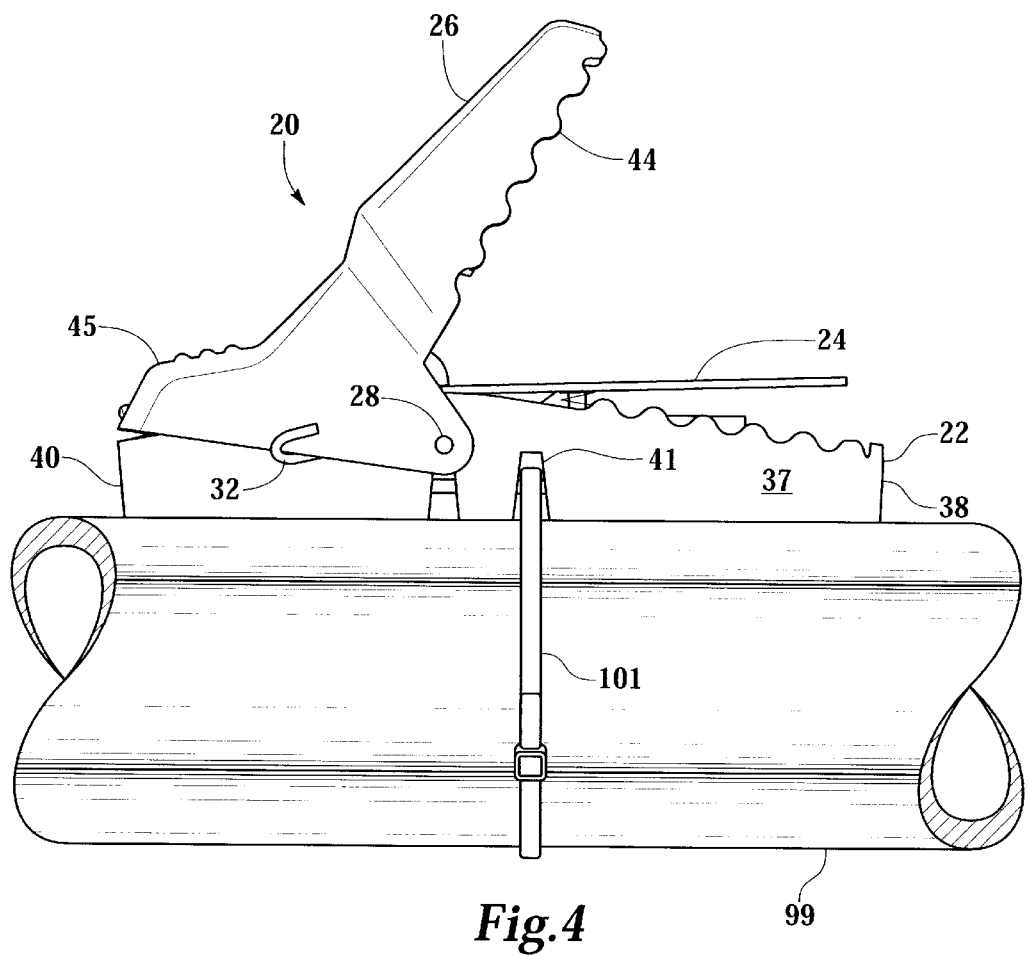
FIG. 4 is a side elevational view of the trap of FIG. 1 mounted to a pipe.

As shown in FIG. 4, the rodent trap 20 is readily mounted to an axially extending support member 99, which may be a metal or plastic pipe, a rafter or beam, a wooden timber, an insulated pipe or a conduit, or other structure which extends in such a way that it can be encircled.

Rodents are known to move along such support members 99, usually positioned at elevated locations. These locations are advantageous spots for trapping a rodent, because it is usually not possible to avoid the trap by going around it, as it completely blocks the passageway.

The rodent trap 20 is mounted to the support member 99 by a single tie member 101 which extends from outside the base and through the first opening 39 in the first side wall 36 of the base 22. The tie member extends from the first opening 39 along the support platform beneath the trigger 24 and out the second opening 41 in the second side wall 37. The tie member 101 is then connected to itself and formed into a loop which is cinched around the support member 99 to mount the base 22, and hence the trap 20, to the support member. The tie member may be any flexible connector such as one of the many flexible plastic cable ties manufactured by Panduit Corp. of Tinley Park, Ill., or a length of wire, etc.

In the illustrated embodiment the first opening 39 and the second opening 41 are positioned in the side walls 36, 37 at a position forward of the ears 62 towards the front wall 38 of the base. However, the openings 39, 41 may be positioned elsewhere along the side walls of the base at some other spot where the base platform 34 is unobstructed, permitting the tie member 101 to pass through the base 22 without obstructing the operation of the trap 20.

The set of openings 39, 41 in the base side walls 36, 37 offers a convenient and rapid approach to securing the rodent trap to a support member 99, even when that support member is elevated or overhead. To place the trap 20 for entrapping rodents, the user positions the rodent trap on and above a support member 99, with the upper jaw sprung and closed on the base 22. In the sprung or unset condition, the trap presents no danger to the user, and there is no risk of an unintentional closure on the user's fingers. The trap upper jaw pivots about a transverse axis, which is generally perpendicular to the direction of travel of a rodent, and likewise generally perpendicular to the support member axial direction. The upper jaw 26 is generally closed, offering protection for the user against inadvertently coming into contact with the trigger when setting the trap. The closed plastic expanse of the upper jaw 26 defines a gripping surface 45 which is engaged by the user's hand when being set.

While the rodent trap 20 is held in position on the support member 99 by one hand, the flexible tie member 101 is inserted through the first opening 39. The tie member, being a plastic tie or wire, is flexible and bendable, but is not totally limp, and is thus readily progressed through the first opening 39 and out the second opening 41. The portions of the side wall above the openings 39, 41 serve to guide the tie, and direct it across the support platform, beneath the trigger, and out the second opening. Once the tie member 101 has penetrated through the trap 20, the ends of the tie member are connected to secure the rodent trap to the support member 99.

Once the trap 20 has been secured in place on the support member 99, the gripping surface 45 of the upper jaw 26 is depressed to set the trap and prepare it to entrap rodents. Because the trap 20 is secured to the support member 99, it can be safely set with only one hand, and thus can be set even if the user must reach overhead or is unable to directly view the trap. Moreover, when maintained by a pest control operator, the trap may be reset, after removing the contents of the previous trapping event, without disturbing the trap from its position on the support member 99.

It is understood that the invention is not limited to the particular construction and arrangement of parts herein illustrated and described, but embraces all such modified forms thereof as come within the scope of the following claims.

I claim:

1. A rodent trap assembly for attachment to a support member extending in an axial direction, the assembly comprising:

a base having a first side wall and a second side wall which extend away from a platform wall;

an upper jaw mounted to the base side walls to pivot about a transverse axis between a set position and a sprung position, the transverse axis being generally perpendicular to the support member axial direction when the trap assembly is attached to the support member;

a spring engaged between the base and the upper jaw and urging the jaw to close upon the base;

a trigger mounted to the base;

a catch mechanism which restrains the upper jaw in the set position until the trigger is actuated;

portions of the first side wall defining a first opening which extends away from the platform wall;

portions of the second side wall defining a second opening which extends away from the platform wall; and a tie member which passes from outside the base, extends through the first opening and out the second opening and is connectable around the support member to mount the base to the support member, the tie member being positioned between the trigger and the base platform wall as it extends across the base.

2. A rodent trap assembly comprising in combination:

a fixed support member extending in an axial direction;

a rodent trap comprising:

a base having a first side wall and a second side wall which extend away from a platform wall;

an upper jaw mounted to the base side walls to pivot about a transverse axis between a set position and a sprung position, the transverse axis being generally perpendicular to the support member axial direction, the upper jaw having a gripping surface which extends between the base first side wall and the base second side wall, the gripping surface permitting the trap to be placed in the set position by depressing the gripping surface of the upper jaw;

a spring engaged between the base and the upper jaw and urging the jaw to close upon the base;

a trigger mounted to the base;

a catch mechanism which restrains the upper jaw in the set position until the trigger is actuated;

portions of the first side wall defining a first opening which extends away from the platform wall;

portions of the second side wall defining a second opening which extends away from the platform wall; and a tie member which passes from outside the base, extends through the first opening and out the second opening and is connected around the support member to mount the base to the support member, the tie member extending between the trigger and the base platform wall.

3. A method for positioning a trap for entrapping rodents comprising the steps of:

positioning on and above an axially extending support member an unset rodent trap having a base having a first side wall and a second side wall which extend away from a platform wall, an upper jaw mounted to the base side walls to pivot about a transverse axis between a set position and a sprung position, the transverse axis being generally perpendicular to the support member axial direction, the upper jaw having a gripping surface which extends between the base first side wall and the base second side wall, the gripping surface permitting the trap to be placed in the set position by depressing the gripping surface of the upper jaw, a spring engaged between the base and the upper jaw and urging the jaw to close upon the base, a trigger mounted to the base, the trigger arranged to cause the upper jaw to close on the base when the trigger is activated, portions of the first side wall defining a first opening which extends away from the platform wall, and portions of the second side wall defining a second opening which extends away from the platform wall;

looping a tie member through the first opening and out the second opening of the trap base, such that portions of the tie member extend above the base platform and below the trap trigger, and connecting ends of the tie member around the support member to secure the rodent trap to the support member; and depressing the upper jaw gripping surface of the secured rodent trap to set the trap and prepare it to entrap rodents.

* * * * *